UNITED STATES PATENT OFFICE.

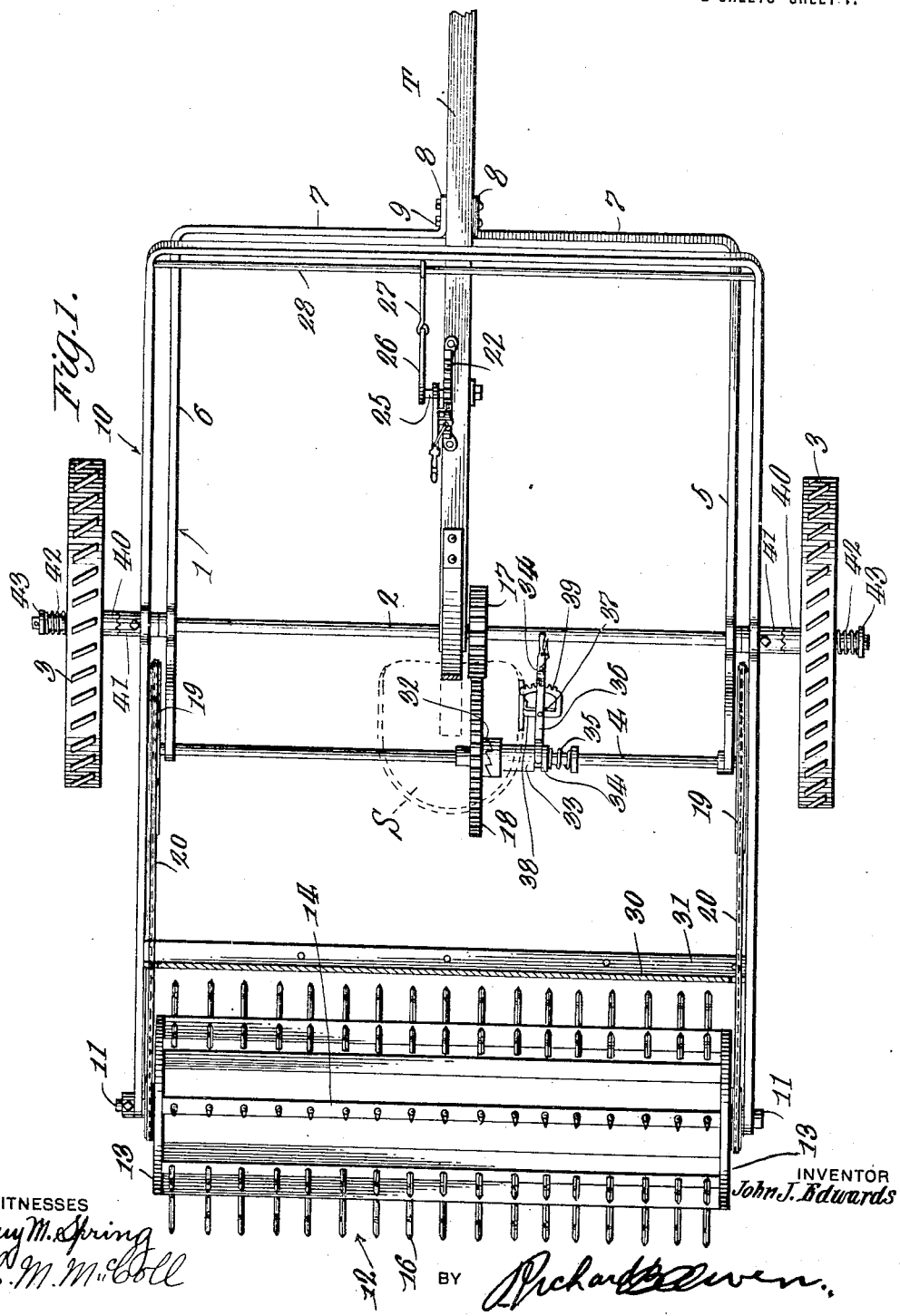

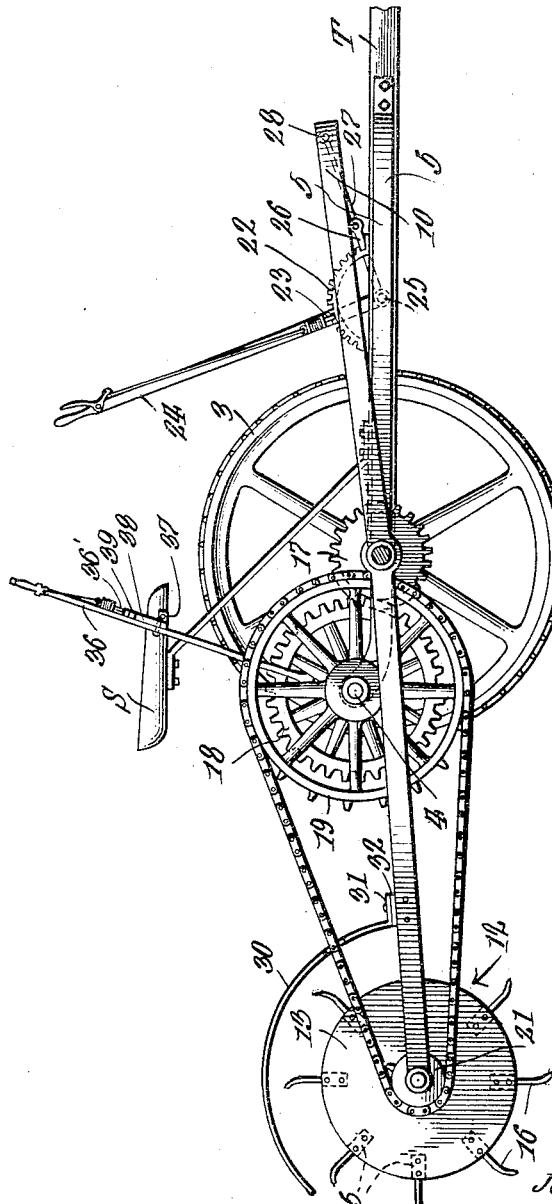

JOHN J. EDWARDS, OF VANCOUVER, WASHINGTON.

ROTARY HARROW.

1,251,198.   Specification of Letters Patent.   Patented Dec. 25, 1917.

Application filed April 27, 1917. Serial No. 165,008.

*To all whom it may concern:*

Be it known that I, JOHN J. EDWARDS, a citizen of the United States, residing at Vancouver, in the county of Clarke and State of Washington, have invented certain new and useful Improvements in Rotary Harrows, of which the following is a specification.

This invention relates to agricultural implements, and more particularly to soil pulverizing machines or harrows of the rotary type.

The main object of the invention is to provide a machine of this character which is simple and efficient in construction and which has means for raising and lowering an earth engaging element so constructed that its operation may be quickly accomplished with a minimum amount of exertion on the part of the operator and which may be thrown into and out of operation at the will of the operator.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a plan view of a machine constructed in accordance with this invention, and Fig. 2 represents a side elevation thereof with one of the traction wheels removed and the axle shown in section.

In the embodiment illustrated, a substantially U-shaped main frame 1 is journaled on an axle 2 supported at its opposite ends by traction wheels 3. This frame 1 is journaled on the axle 2 at points spaced inwardly from the free ends of the arms thereof and between said free ends is rotatably mounted a shaft 4, hereinafter further described.

The frame 1 is preferably composed of two L-shaped sections 5 and 6, the short arms 7 of which are extended toward each other and provided with forwardly projecting lateral fingers 8, between which the tongue T of the machine is disposed and clamped by bolts 9 passing through said fingers and said tongue as is shown clearly in Fig. 1.

Another U-shaped reel or drum frame 10 is journaled on the axle 2 outside frame 1, said axle passing through the arms of said frame 10 at points intermediate the ends thereof, preferably midway their length. The cross bar of the frame 10 extends substantially in alinement with the cross bar of frame 1, but the arms of said frame are made considerably longer than the arms of frame 1 and their free ends extend rearwardly some distance beyond the shaft 4 carried by frame 1 and in the terminals of which are journaled stub shafts 11 of a rotary pulverizing drum or reel 12.

This drum 12 is preferably in skeleton form and constructed of two end disks 13 which carry the stub shafts 11. These disks 13 are connected by a plurality of cross bars 14 shown formed of heavy strap iron with their ends turned inwardly at right angles as shown at 15 and secured to the inner faces of said disks by riveting or otherwise. Any desired number of these bars 14 may be employed, eight being here shown. These bars 14, in addition to connecting the disks 13, carry pulverizing teeth 16 which are arranged in longitudinally spaced relation on each bar, any desired number being employed, and which are preferably curved.

The frames 1 and 10 are preferably constructed of heavy strap iron and the tongue T which is clamped between the sections of frame 1 extends rearwardly and has an aperture in its rear end through which the axle 2 extends. A seat S of ordinary construction is mounted on the tongue T.

The driving mechanism for the pulverizing drum 12 as here shown comprises a cog wheel 17 fixed to the axle 2 intermediately of its ends and which meshes with a gear 18 loose on shaft 4 by means of which motion is imparted to shaft 4 from the axle 2, it being understood that the axle 2 receives its motion from the traction wheels 3 carried on the ends thereof.

Fixed to both ends of shaft 4 between frames 1 and 10 are large sprocket gears 19 which are connected by sprocket chains 20 with smaller sprocket gears 21 fixed to the stub shafts 11, said wheels being here shown mounted on said shafts between the outer faces of the adjacent disks 13 and the arms of frame 10 in which said axle is journaled.

It will thus be seen that by means of this gearing, motion is transmitted from the traction wheels 3 through axle 2, cog wheel 17, gear 18, shaft 4, sprocket wheels 19, sprocket chains 20, and gears 21 to the drum, thereby rotating the drum, causing the teeth thereof to engage the surface over which the machine is drawn, thoroughly pulverizing it. It will be obvious that owing to the difference of the sizes of the gears 19 and sprockets 21 that the drum 12 will be rotated at a much higher speed than the shaft 4 and this speed may be varied by varying the size of these gears.

Gear 18 which is loosely mounted on shaft 4 has a clutch member 32 on one face thereof adapted to normally mesh with a coöperating clutch member 33 mounted to slide on and turn with shaft 4. This clutch member 33 which is pressed normally into meshing engagement with member 32 by a coiled spring 35 has a groove 34 to receive an operating lever 36. This lever 36 is fulcrumed at 37 on a bracket 38 carried by seat S and is provided with a spring pressed dog 36' which is adapted to removably engage a rack 39 carried by bracket 38 whereby lever 36 is locked in adjusted position for holding the clutch members out of mesh. This is desirable when it is desired for any reason to throw the toothed drum out of operation, as when passing from field to field. It will thus be seen that the operator by actuating lever 36 may disengage the clutch members when desired and permit the ground wheels to revolve without affecting drum 12.

For raising and lowering the frame 10 to properly position the pulverizing drum in relation to the earth over which it is to pass, the following mechanism is employed:—A segmental rack 22 is fixed to tongue T and is adapted to be engaged by a spring pressed locking dog 23 carried by a lever 24 which is fixed at one end, to a short shaft 25 journaled in the tongue as is shown clearly in Figs. 1 and 2 and by means of which the lever may be locked in adjusted position. An arm or link 26 is fixed at one end to shaft 25 and projects laterally therefrom at substantially right angles to the lever 24 forming in connection with said lever a bell crank which operates to raise and lower frame 10 by means of a link 27 which is loosely connected at one end with the free end of arm 26 and at its other end with a rod 28 arranged transversely of the frame adjacent the cross bar thereof as is shown clearly in Fig. 1.

It will thus be seen that by moving said lever 24 rearwardly the front end of the frame 10 will be raised and its rear end lowered thereby lowering the pulverizing drum 12 to position it close to the earth in connection with which it is to be used. When the lever 24 is moved forwardly the front end of frame 10 will be lowered and its rear end correspondingly raised thereby elevating the pulverizing drum to cause the teeth to clear the surface of the ground over which the machine is drawn or to adjust it so that the teeth will enter the ground at a greater or less depth at the will of the operator.

A shield or hood 30 is disposed over the pulverizing drum 12 to protect it from the weather and to prevent the dust produced by the pulverizing teeth from rising and discommoding the operator. This hood 30 may be composed of any suitable material, preferably of sheet metal, and is preferably substantially semi-cylindrical in form with a flange 31 projecting laterally from one edge thereof, and which is designed to be bolted or otherwise secured to a cross bar 32 arranged between the arms of frame 10 as is shown clearly in Figs. 1 and 2.

Each wheel 3 has a clutch member 40 on the inner end of its hub which is yieldably engaged with a coöperating clutch member 41 fixed to axle 2, being held in such engagement by a coiled spring 42 disposed between the outer end of the wheel hub and a washer or nut 43. The wheels being loose on axle 2 and connected as above described operates as a differential so that when one wheel goes faster than the other, the clutch connection thereof will permit them to slip until the machine moves straight ahead again.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. In a machine of the class described, a pair of traction wheels, an axle fixed to and connecting said wheels, a pair of U-shaped frames arranged one within the other and journaled on said axle intermediately the ends of their arms with the cross bars thereof projecting forwardly, the cross bar of the inner frame extending in advance of that of the outer and in a plane below it, the outer frame having its arms extending rearwardly beyond those of the other frame, the free ends of the arms of the inner frame extending in rear of the axle, a pulverizing reel rotatably mounted on the rearwardly projecting arm of the outer frame, a driving shaft carried by the arms of the inner shorter frame, coöperating gears carried by said axle, shaft and reel whereby the latter is rotated on the turning of the traction wheels, and means for raising and lowering the front end of said reel carrying frame whereby its rear end is correspondingly raised and lowered to vary the position of the reel relative to the surface which it is designed to work.

2. In a machine of the class described, a pair of traction wheels, an axle fixed to and connecting said wheels, a pair of U-shaped frames arranged one within the other and journaled on said axle intermediately the ends of their arms with the cross bars thereof projecting forwardly, the cross bar of the inner frame extending in advance of that of the outer and in a plane below it, the outer frame having its arms extending rearwardly beyond those of the other frame, the free ends of the arms of the inner frame extending in rear of the axle, a pulverizing reel rotatably mounted on the rearwardly projecting arm of the outer frame, a driving shaft carried by the arms of the inner shorter frame, coöperating gears carried by said shaft and axle, the gear of said shaft being normally loose, a clutch for connecting said gear to said shaft, a chain and sprocket connection between said shaft and said reel whereby the reel is driven by the rotation of the traction wheels, means under the control of the operator for raising and lowering the front end of said reel carrying frame for controlling the position of the reel relative to the surface which it is designed to work, the projecting front end of the inner frame operating as a stop for limiting the downward movement of the front end of the outer frame.

In testimony whereof I affix my signature in presence of two witnesses.

JOHN J. EDWARDS.

Witnesses:
 WM. C. BATES,
 HARRY E. PULLAM.

Copies of this patent may be obtained for five cents each, by addressing the "Commissioner of Patents, Washington, D. C."